R. WRIGHT.
METAL WHEEL.
APPLICATION FILED MAY 18, 1918. RENEWED SEPT. 18, 1920.
1,366,047.
Patented Jan. 18, 1921.
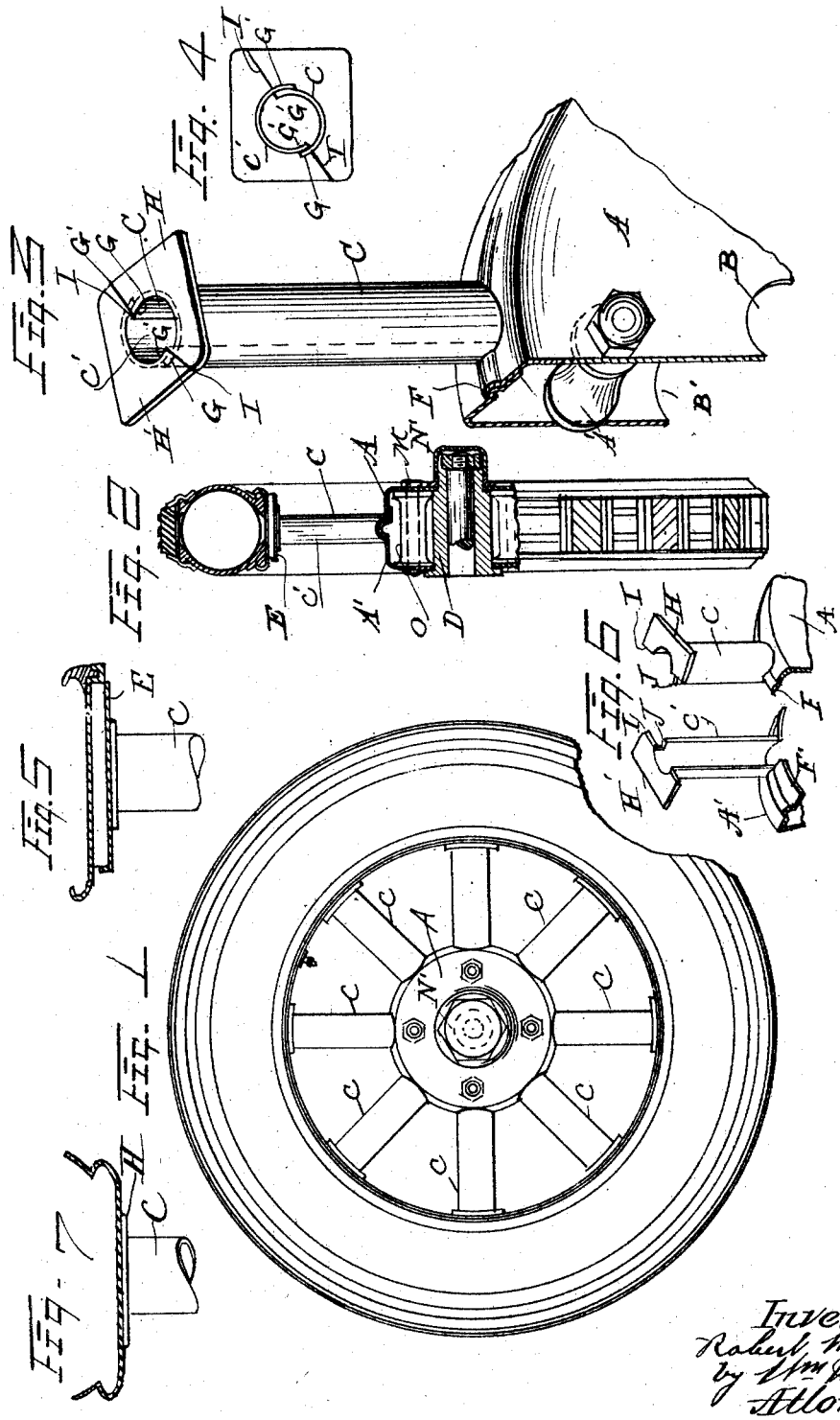

UNITED STATES PATENT OFFICE.

ROBERT WRIGHT, OF CLEVELAND, OHIO.

METAL WHEEL.

1,366,047.  Specification of Letters Patent.  Patented Jan. 18, 1921.

Application filed May 18, 1918, Serial No. 235,269. Renewed September 18, 1920. Serial No. 411,266.

*To all whom it may concern:*

Be it known that I, ROBERT WRIGHT, a citizen of the United States, and resident of Cleveland, in the county of Cuyahoga and State of Ohio, have invented certain new and useful Improvements in Metal Wheels, of which I hereby declare the following to be a full, clear, and exact description, such as will enable others skilled in the art to which it appertains, to make and use the same.

The objects of the invention are to provide an improved form of construction for a sheet metal wheel, by means of which the heavy wooden felly is dispensed with, and thus saving the additional weight at the outside and lessening the flywheel effect of rapid rotation. Also a ventilated rim is produced giving the tire a greater chance to radiate its heat.

The invention comprises a division of my former application Serial No. 142,429 filed Jan. 15th, 1917 as to the common features, showing a circumferentially divided hub, and integral longitudinally divided spokes, and a felly band and a demountable rim, superimposed thereon and also comprises the details of construction, hereinafter described, shown in the accompanying drawings and specifically pointed out in the claims.

In the accompanying drawings, Figure 1 is a side elevation of the device,

Fig. 2 is a transverse section thereof on center line of spokes,

Fig. 3 is a perspective of a portion of the hub, and one spoke illustrating the manner of assembling the parts, Fig. 4 is a transverse section of one of the spokes, Fig. 5 is an enlarged section of the felly band and rim;

Fig. 6 is a perspective illustrating the interlocking constructons of the spokes and showing members before assembling, Fig. 7 illustrates the use of a single clencher rim.

In these views A, A' represent two halves of a sheet metal hub, the centers of which are provided with axial openings B, B' one being larger than the other, through which a metal hub D is inserted.

The hub members are stamped from sheet metal plates integrally with members C and C', respectively of the radially arranged spokes to the outer extremities of which a metal rim or felly band E is attached in any convenient manner such as brazing, spot welding or riveting. The sheet metal hub members overlap at F, F' at their circumferential edges and each edge has its corresponding semi-cylindrical spoke portion integrally formed therewith and illustrated in Fig. 6. The sides of one of the spoke members overlap the sides of the opposed spoke member in the manner shown; the edge G of one member overlapping the adjacent edge G' of the other member to make a thoroughly firm joint therewith. At the outer extremity of each spoke member is shown a transversely extended flange or integral plate H and H' respectively. These flanges abut against each other at I, I and overlap alternate edges of the spoke members at J, J.

A felly band or rim member E is sleeved over the spokes and attached flanges and all the overlapping parts are attached together by rivets, electric spot-welding or brazing, so that one integral structure results, which while light in weight is rigid and is proportioned to resist lateral and radial strains of all kinds and is easily constructed from sheet metal from dies.

The outer rim or band can be used directly as a tire holding rim, or a demountable rim L can be superimposed thereon as described in my previous application, Serial No. 142,429, filed Jan. 15th, 1917.

The hub extremities are dished in form to give added strength and the spokes are hollow and are preferably semicylindrical in shape or slightly tapering to give the general appearance of an artillery wheel. Bolts M, M, secure the inner edges of the hub members together and they are positively spaced by means of spool shaped sleeves N, N. An outer cap N' secures the parts of the hub together.

Having described the invention what I claim as new and desire to secure by Letters Patent is:

1. In a metal wheel, hub and spoke members constructed of sheet metal and provided with overlapping marginal flanges rigidly secured together, the marginal flanges of the hub members being annular and extending transversely of the wheel and the said spoke members being also provided with transversely disposed terminal flanges at their outer extremities, and a metal rim attached to said transversely extending terminal flanges.

2. In a metal wheel, a metal hub member provided with spaced shoulders, dished sheet metal hub members sleeved over said metal hub, and resting against said shoulders, bolts securing said dished hub members together, spacing sleeves on said bolts, the circumferential edges of said dished members provided with overlapping inwardly extending annular flanges, opposed spoke members integrally attached to said dished members, interlocking flanges upon the longitudinal edges of said spoke members, abutting laterally extending flanges upon the outer extremities of said spoke members, and a metallic rim extended over the flanges at the extremities of said spokes.

3. A wheel comprising dished sheet metal hub members, longitudinally joined spoke members integral with said hub members, and a rim member sleeved over the extremities of said spoke members, said hub and spoke members being provided with marginal overlapping flanges secured together, the flanges of the hub members being of annular formation and interlocked with each other.

4. The combination of dished hub members provided with inwardly extending annular circumferential flanges overlapping each other and provided with interlocking ribs, and spokes carried by the hub members.

In testimony whereof, I hereunto set my hand this 23rd day of April 1918.

ROBERT WRIGHT.

In presence of—
R. W. JEREMIAH,
WM. M. MONROE.